J. E. CAMPBELL.
HARVESTER REEL.
APPLICATION FILED JULY 18, 1908.

907,966.

Patented Dec. 29, 1908.

2 SHEETS—SHEET 2.

Witnesses
Edwin L. Bradford
Chas Liukins

Inventor
James E. Campbell,
By Wallace Greene,
Attorney.

UNITED STATES PATENT OFFICE.

JAMES E. CAMPBELL, OF RIVERSIDE, CALIFORNIA, ASSIGNOR OF ONE-HALF TO THEODORE D. HEWITT, OF RIVERSIDE, CALIFORNIA.

HARVESTER-REEL.

No. 907,966.     Specification of Letters Patent.     Patented Dec. 29, 1908.

Application filed July 18, 1908. Serial No. 444,219.

*To all whom it may concern:*

Be it known that I, JAMES E. CAMPBELL, a citizen of the United States, residing at Riverside, in the county of Riverside and State of California, have invented certain new and useful Improvements in Harvester-Reels, of which the following is a specification, reference being had therein to the accompanying drawing.

This invention relates to reels capable of lifting and presenting to the cutters grain, grass, or the like, that has fallen below, or partly below, the plane of the cutting apparatus. It involves sets of hooks arranged to move down, point forward, in front of the reel's axis and when their points are near the ground to turn on an axis transverse to the reel's axis thereby passing beneath the grain to be lifted. In this position they are carried on bodily about the reel's axis to present the grain to the cutters, and as they again rise to the uppermost portion of their paths, they are rotated back to initial position, ready for again entering the fallen grain.

Figure 1:
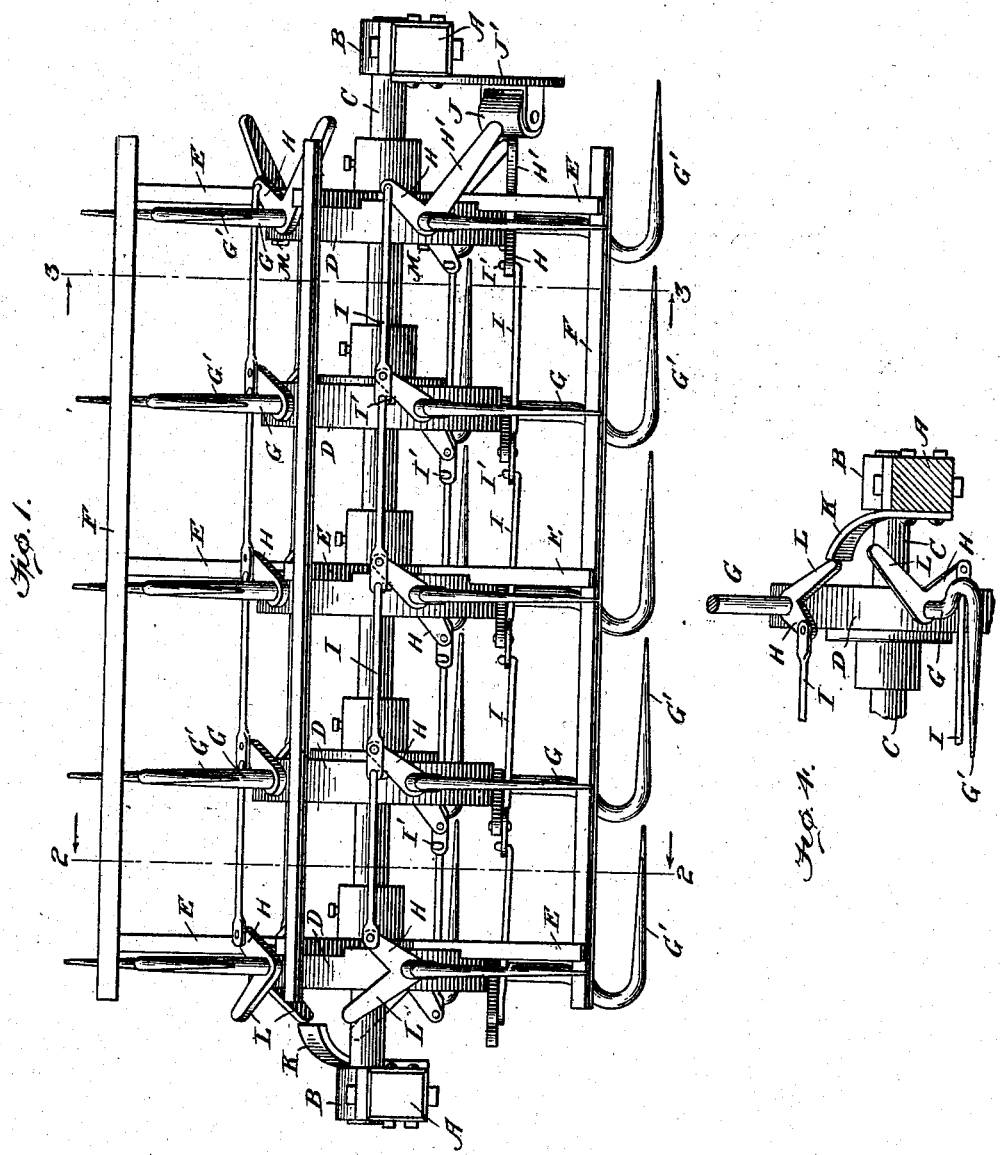
Figure 2:
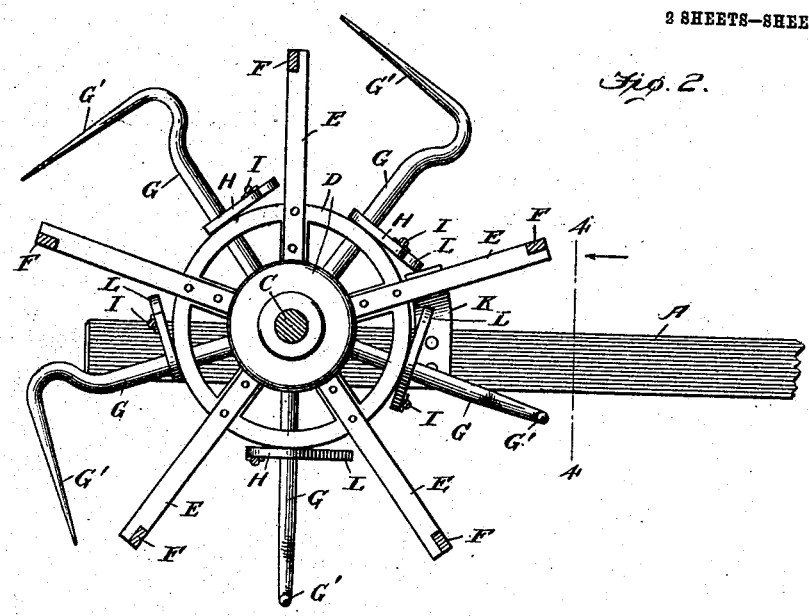
Figure 3:
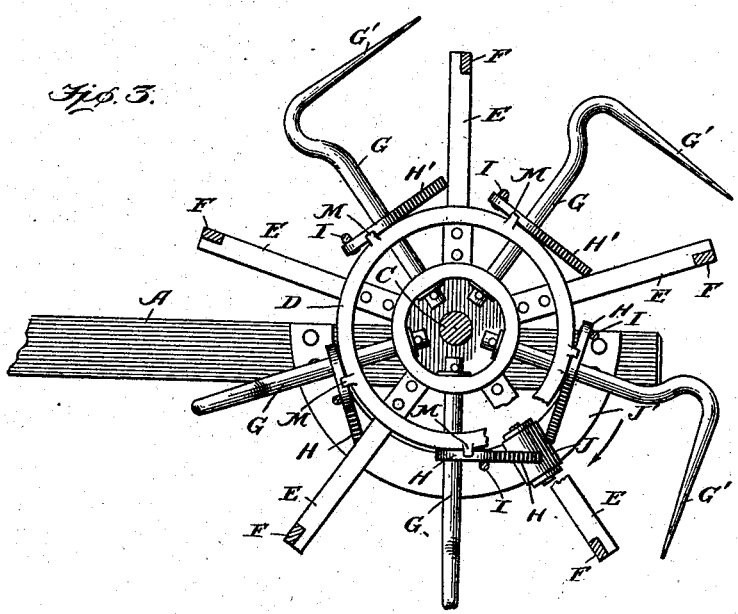

In the accompanying drawings, Figure 1 is a front elevation of the reel and the parts which support it. Fig. 2 is a section on the line 2—2, Fig. 1, looking toward the left. Fig. 3 is a section on the line 3—3, Fig. 1, looking toward the right. Fig. 4 is a section on the line 4—4, Fig. 2, looking to the left, and showing only a part of the reel.

In these views, A, A represent reel-supporting members of a harvester, or the like, and B, B bearings fixed thereon for holding the usual horizontal reel shaft C, upon which are adjustably fixed a series of skeleton, wheel-like disks, D, perpendicular to the shaft. Preferably, to these disks respectively are rigidly secured equally spaced radial arms E bearing at their ends beaters or bars, F parallel to the reel shaft. Between the sets of arms E and preferably midway between them, radial rods G are revolubly mounted in the disks, respectively, and the outer end portion of each rod is first bent laterally in one direction and then curved back in the contrary direction so that its long, straight and pointed terminal portion G' is at right angles with the body of the rod, partly upon opposite sides of its axis, and when the rod is so turned that this terminal portion is parallel to the reel's axis at a distance therefrom approximately the same as the bars F. When however the rod is so turned that this terminal portion is in the plane of the corresponding disk, the sharp point projects far outside the path of said bars. From each rod G just outside the corresponding disk a short rigid arm H projects and all these arms which belong to the same lineal set of rods are connected and held parallel by links I pivoted to the arms respectively and engaged with each other in succession by hooks I'.

Each of the rods, G, which are mounted in the disk at one end of the reel, is also provided with a rigid arm H' extending outward beyond the end of the reel, and in the lower forward quadrant of the rotary path of these arms a cam or roller J is mounted on a fixed support J' secured to the reel-supporting portion of the frame.

Each of the rods G has its hook G' in the plane of its disk, as it descends on the front of the reel, with the point projecting outside the path of the reel bars F, and consequently at the instant when the arm H' strikes the roller J these points are very near the ground. As said arm in advancing is pushed aside by the roller, the rods G and hooks G' of the corresponding lineal set are rotated approximately 90°, the points of the hooks rising and the several parts G' moving beneath down grain and lifting it as they swing into alinement in the path of the bars F to form a nearly continuous reel bar, as seen in the lower part of Fig. 1. While in this position the hooks move on bodily with the rotating reel to rise upon the rear side of the latter after passing the cutting devices (not shown). During their return to the front side of the reel, the hooks are all again turned into the planes of their disks by means of a cam or deflecting spring member K fixed to the frame in position to push aside the rigid arms L projecting from the several rods G carried by one of the end disks, the action being strictly analogous to the action of the arms H' and roller J at the opposite end of the reel, although the rotation of the rods is in the contrary direction, and the hooks of the lineal sets, in succession, are thereby returned to the plane of their disks ready for entering the fallen grain.

That the hooks G' may not be turned beyond alining position by the roller J, I provide suitable stop devices, shown for illustration as lugs M on the end disk in the path of the arms H, and to limit the contrary movement the ends of the link hooks I' are bent into position to meet the corresponding arms H. It has not been found necessary practically to provide special means for resisting movement from either limit of the rotary motion of the rods G, and therefore no special devices are shown.

It is obvious that the operation of the hooks for picking up grain is not dependent upon the presence of the reel bars F, which when present, act upon erect grain as the like bars do with an ordinary reel. It is also evident that in case it is desired to use the novel reel without the special picking up function, it is only necessary to remove the shifting devices J, K and swing each lineal set of hooks into alining position, as shown in the lower part of Fig. 1.

What I claim is:

1. A harvester reel provided at its periphery with grain lifting hooks mounted for turning from a position approximately tangential to that periphery to a position approximately parallel thereto, substantially as set forth.

2. A reel for harvesters or the like provided at its periphery with grain lifting hooks, in series lines parallel to the reel shaft and mounted for turning from approximately tangential position to approximate parallelism to the reel, and combined with means for at desired intervals changing them from one position to the other.

3. The combination with a reel provided with grain lifting hooks mounted for turning, of means for causing the hooks to stand in vertical planes as they are carried into the grain by the rotation of the reel and to turn automatically out of said planes as they near the ground in moving with the reel.

4. In apparatus of the class described, the combination with a reel shaft, of a grain lifting hook carried by the shaft and mounted for rotation, upon an axis transverse thereto, from a plane perpendicular to the shaft to a plane approximately parallel thereto, means for causing such rotation when the hook in revolving bodily with the shaft closely approaches its lowest position, and means for restoring the hook to original position before it again enters the grain.

5. In a reel of the class described, the combination with a revolubly mounted horizontal reel shaft, of a series of revolubly mounted radial rods carried by the shaft and each having its free outer end portion bent laterally to lie in a line approximately at right angles to the radial portion, means for turning said end portions in to planes approximately perpendicular to said shaft as they rotate with the latter, and means for turning them to position parallel to the shaft as they near the lowest point in their paths, respectively.

6. In apparatus of the class described, the combination with a revolubly mounted reel shaft of series of like radial rods provided with hooks at their outer ends and mounted at intervals along said shaft in the same radial plane, to rotate upon their own axes and bodily with the shaft, and means whereby said hooks are simultaneously turned through angles of approximately 90° at intervals as they move bodily about the axis of the reel shaft.

7. The combination with a reel shaft, of series of spaced radial rods provided with hooks at their outer ends and mounted upon said shaft to rotate about their own axes and to revolve bodily with the shaft, each series consisting of a plurality of rods lying in the same radial plane, means for turning the hooks of each series to forwardly-pointing position before they enter the grain, and means for turning the hooks of each series to laterally-pointing position as they closely approach the lowest point in their path.

8. In apparatus of the class described, the combination with reel supporting members and a reel shaft revolubly supported thereby, of a series of spaced reel bars parallel to the shaft and carried thereby, peripheral grain lifting hooks arranged in series alternating with said bars, means for turning the hooks of each series to forwardly-pointing position before they descend into the grain as the reel rotates, and means for turning them to an angle with such position as they approach, in the grain, their lowermost position.

9. In apparatus of the class described, the combination with a horizontal revolubly mounted reel shaft, of a series of spaced disks perpendicular to the shaft and fixed thereto, a set of spaced radial rods revolubly mounted in each disk and each having at its outer end a long hook approximately at right angles with the remaining or body portion, devices connecting the corresponding rods of all the disks to rotate together about their respective axes, rigid arms projecting respectively from one terminal rod of each series of corresponding rods, a deflecting device fixed in the common path of said arms, analogous arms projecting respectively from the opposite terminal rod of each series, and a deflecting device in the common path of the arms last mentioned.

In testimony whereof I affix my signature in presence of two witnesses.

JAMES E. CAMPBELL.

Witnesses:
THEO. D. HEWITT,
ALFRED OSBRINK.